July 27, 1926.
E. C. MORGAN
ELECTRIC LOCOMOTIVE
Original Filed Jan. 24, 1921   2 Sheets-Sheet 1
1,593,589
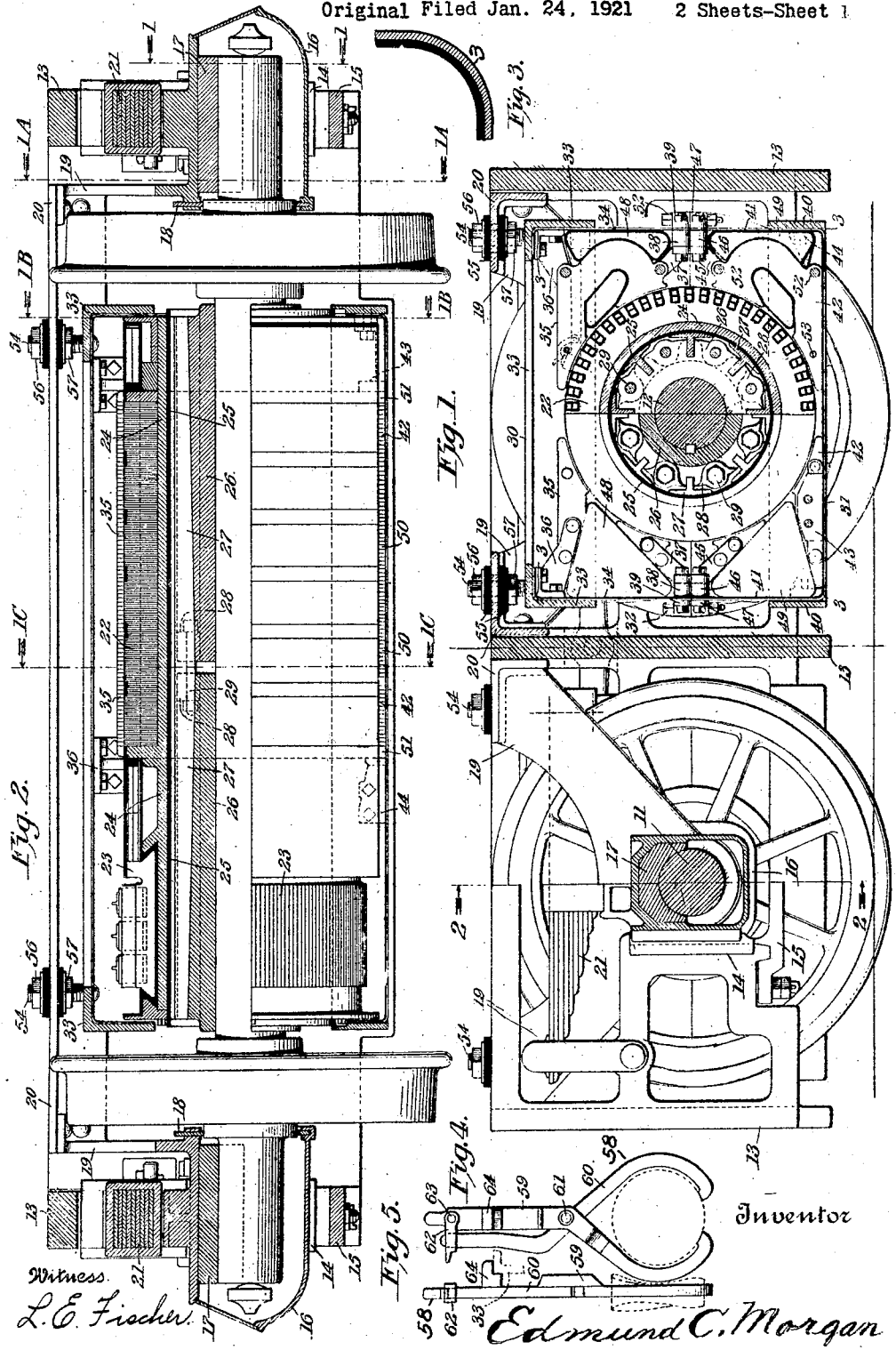
Witness
L. E. Fischer
Inventor
Edmund C. Morgan

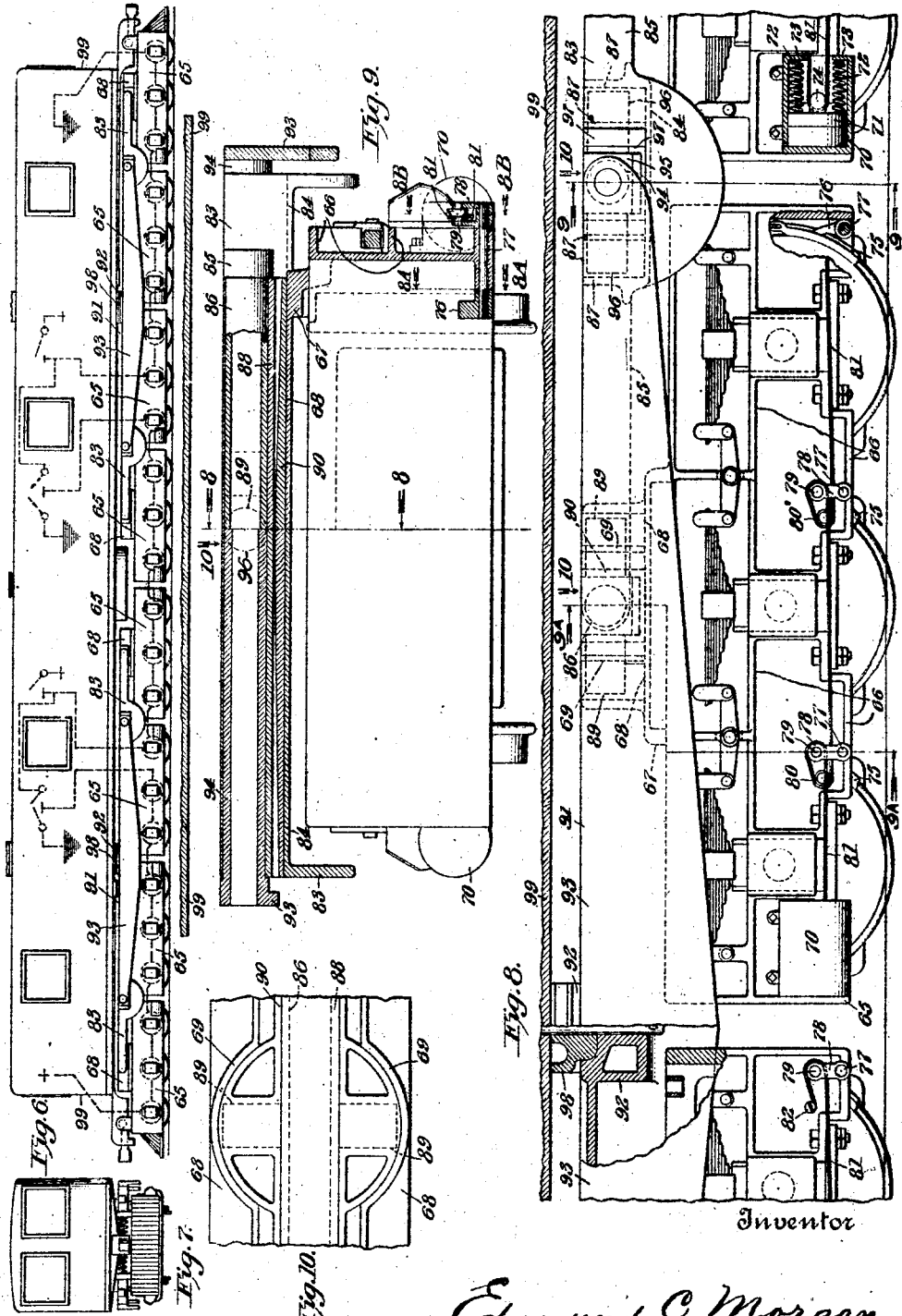

Patented July 27, 1926.

1,593,589

UNITED STATES PATENT OFFICE.

EDMUND C. MORGAN, OF NEW YORK, N. Y.; OLIVE EUGENIE MORGAN EXECUTRIX OF SAID EDMUND C. MORGAN, DECEASED.

ELECTRIC LOCOMOTIVE.

Application filed January 24, 1921, Serial No. 439,559. Renewed April 11, 1924.

My invention relates to the improvements in electric locomotives and the objects of the improvement are to provide a locomotive of great power for operation at high speed on track with light rails, sharp curves and heavy grades; to enable such locomotive to operate with safety and reliability on electric current of high tension so that conductors of comparatively small size may be used to convey the current to it. Other objects will appear in the description.

I attain these objects by the mechanism illustrated in the accompanying drawings, in which:

Figure 1 is a side elevation partly in section and Fig. 2, an end elevation partly in section of a locomotive truck having two driving elements which may be operated that way or extended to contain three or more of the driving units. Two or more of these trucks may also be combined to form a single locomotive. The four sections shown in Fig. 1 are taken on Fig. 2 as indicated by the dotted lines as follows— that part to the left of a vertical line through the axle 11 at 1, 1, Fig. 2.; that part between a vertical line through the center of the axle 11 and a vertical line through the longitudinal center of the truck at 1ᴬ, 1ᴬ, Fig. 2; that part between a vertical line through the longitudinal center of the truck and a vertical line through the center of axle 12 at 1ᴮ, 1ᴮ, Fig. 2, and that part to the right of a vertical line through the axle 12 at 1ᶜ, 1ᶜ, Fig. 2, all looking in the direction indicated by the arrows. The section shown in Fig. 2, is taken on dotted line 2, 2, Fig. 1 looking in the direction indicated by the arrows. The lower part of the armature, the wheels and axle that are centered on this line are shown in elevation. Fig. 3 shows a section of any one of the corners marked 3. Fig. 1, to better show the construction of a part that is on too small a scale in Fig. 1 to show clearly. Figs. 4 and 5 are side view and end view respectively of a device for facilitating the adjustment of some of the parts shown in Figs. 1 and 2. Figs. 6 and 7 are side and end elevations respectively of a locomotive made up of a number of trucks such as those described with reference to Figs. 1 and 2. Figs. 8 and 9 are respectively a side elevation partly in section and an end elevation partly in section, on a larger scale of a portion of the structure shown in Figs. 6 and 7. The three sections shown in Fig. 8 from left to right are taken respectively at 8, 8; 8ᴬ, 8ᴬ and 8ᴮ, 8ᴮ Fig. 9 looking in the direction indicated by the arrows. That portion of Fig. 9 to the right of the vertical center line is an irregular section taken as indicated by the horizontal arrows at the left-center of Fig. 8, and that portion of Fig. 9 to the left of the vertical center line is taken on the vertical line indicated by the arrows at the right of Fig. 8. Fig. 10, is a plan view looking in the direction indicated by the arrow 10 Fig. 9 and the arrows 10, 10 Fig. 8 of a portion of the mechanism which the arrows point to. The same type of construction is shown in two places in Fig. 8.

Similar reference characters refer to similar parts throughout the several views.

Referring to Figs. 1 and 2, the main frame 13 of the truck has vertical faces, one at each side of each axle box for the reception of the wearing shoes 14, held up in place by the cross bars 15. The axle boxes 16 with removable wearing brasses 17 and dust guards 18, each have projecting outwardly and upwardly from them on each side at an angle of about 45 degrees the two arms 19. These arms are made with flanges at their outer ends to fit angle bars 20, which extend across the locomotive and connect the ends of the arms 19 of the two axle boxes of an axle by means of rivets. Leaf springs 21, are mounted in the truck frame 13 and bear on the tops of the axle boxes 16 to spring support the truck frame in the usual way.

I will now describe the motors one of which is mounted on axle 11 and one on axle 12. As these two motors are exactly alike I have used the same reference signs for them so the description of one will apply to both. The armature parts consisting of the notched soft steel rings 22, the commutator bars 23, together with the usual windings, insulation and binding wires, are carried on the metal sleeve 24. It will be noted that the commutator bars 23 are built into the sleeve 24 instead of being assembled in a separate casing as is the usual practice. The object of this construction is to provide bars of large capacity in the small space available because of the large internal diameter of the sleeve 24. On the inner surface of the sleeve 24 is placed insulation tube 25, made of material of high heat and electric resisting quality. Fitted to the axle on which the armature is mounted are two long hubs 26 provided with a series of tapered slots to receive the tapered central flanges of the T shaped bars 27. These bars are curved across the T heads to fit the curvature of the inside of the insulation tube 25. When the two hubs 26 are brought together the wedging action will cause the bars 27 to be pressed tightly against the insulation and form an effective driving means between the armature sleeve 24 and the axle. The hubs are held together by means of the flanges 28 and the bolts 29.

The field frame of the motor consists of two assembled parts 30 and 31, arranged to be bolted together or a horizontal line running through the center of the axle by means of the bolts 32, two at each end. The framework of the upper frame 30 of the field frame consists of the rectagular frame 33 within which the rectangular shaped frame 34 is partly inclosed. The frame 34 is composed partly of metal and partly of insulating material as shown by an enlarged section of one of the corners 3 in Fig. 3. The two pole pieces 35 which are carried in the upper frame 30, each have brackets 36, one at each side, and brackets 37, one at each side, attached to them. The brackets 36, each have flanges at their outer ends and are attached to the frame 33 and the upper part of the frame 34 by means of cap screws. The brackets 37 each have flanges at their outer ends and are secured to the spacer pieces 38, the lower part of the frame 34 and the outer lugs 39 by means of through bolts. The framework of the lower frame 31 of the field frame, consists of the rectangular frame 40, within which the rectangular pan shaped frame 41 is partly inclosed. The frame 41 is composed partly of metal and partly of insulating material as shown by an enlarged section of one of the corners Fig. 3. The two pole pieces 42 which are carried in the lower frame 31, each have brackets 43 attached to them at one side and brackets 44 attached to them at the other side. These brackets 43 and 44 each have flanges at their outer ends and are attached to the frame 40 and the lower part of the frame 41 by means of cap screws. The two pole pieces 42 also each have brackets 45 attached to them one at each side, which have flanges at their ends and are secured to the spacer pieces 46, the upper part of the frame 41 and the outer lugs 47 by means of through bolts. It will be noted that the outer lugs 39, 47 are for the purpose of carrying the bolts 32 which connect the two frames 30, 31 together.

The pole pieces 35 and 42 and their exciting coils 48 and 49 respectively are alike, so I will describe the construction and novel features of one pole piece and exciting coil which will serve to describe all: Referring to the outline of the right hand pole piece 42 of the motor shown at the right in Fig. 1, it is made up of a number of thin soft steel pieces 50, with a thick metal piece 51, at each side secured together by long rivets 52 and a long rivet 53, Fig. 1. Referring to the outline shown in Fig. 1, it will be noted that starting at the lower pole where the metal is tapered and curved to form the pole face, the body of the metal runs in a straight horizontal line of a uniform width for a considerable distance then turns to an angle of approximately 45 degrees and runs some distance of a uniform width which is the same width as the horizontal portion, then curves for a distance of approximately 90 degrees through which it maintains a uniform width which width is the same as the horizontal portion and the angling portion then widens to the second pole face which is approximately the same width as the first mentioned pole face and has the same curvature. It will be noted that this novel form of field core provides a very short magnetic path requiring small exciting capacity and that it enables an eight pole motor of light weight to be constructed in which the diameter of the armature can be approximately the same as the distance across its field frame in one direction and in which the dimension across the field frame in the opposite direction is very short. The dimension of the motor in the direction last mentioned for the field frame is enabled to be still further reduced by the novel construction of the field coils. Referring to the field coils 49, one shown in sectional outline on the pole piece 42 that was described above, and the other in full outline on the opposite pole piece 42, Fig. 1, it will be noted that the winding which fills the space between the pole faces spreads out fan like, which, owing to the curved shape of the pole piece can be done without lengthening the winding to an appreciable extent, if any, thus forming a coil with outside outline of a triangle.

The rectangular frames 33, Figs. 1 and 2, are each provided with four stud bolts 54, and are secured to two of the angle bars 20, through insulation 55. The stud bolts 54 are adjustable vertically and can be locked in the position desired by means of the nuts 56 and 57 which have suitable washers between each of them and the insulation 55. It will be noted that by adjustment of the stud bolts 54 the entire field frame can be adjusted vertically so as to compensate for the wear of the axle boxes 17. To facilitate this being done quickly and accurately, I have provided a gauge 58, Figs. 4 and 5. This consists of the two pieces 59 and 60 pivoted together by the rivet 61. The piece 59 has a latch 62 on rivet 63 and a projection 64. This gauge is made of such dimensions that when the notched portion of the projection 64 is resting on the top surface of the part 33 of the motor frame at one side of the motor, the lower points of the pieces 59 and 60 will bear on the underside of the inside end of the hub of the driving wheel next to that side of the motor. If it is found that there has been wear so as to bring the upper pole faces of the motor too near the armature, the nuts 57 and 56 are turned to correct the matter. The use of two of these gauges, one at each side of a motor, is desirable.

Referring to Figs. 6, 7, 8, 9 and 10, which illustrate a locomotive having a number of trucks provided with motors like that described above, Figs. 6 and 7 are side and end elevations respectively, on a small scale, to show the arrangement in full of the trucks, the mechanism for harnessing them together and the single car body used. Figs. 8, 9 and 10, on a larger scale illustrate some of the novel parts more clearly.

The truck frames 65 each correspond with truck frame 13 Figs. 1 and 2 and in addition have ribs 66 at the sides and projections 67 at each side connected together by a ribbed plate 68, the ribs 69 of which are curved at the center to form a vertical bearing. The truck frames 65 each have two braking mechanisms, one at each side, not shown with the truck 13. These braking mechanisms are independent in their action except that the compressed air with which to actuate them is intended to be supplied through connecting pipes so they will operate simultaneously. These braking mechanisms are alike so I will describe one which will apply to all. The cylinder 70, has the piston 71 on which the compressed air is intended to act on one side. Helical compression springs 72 are disposed in the cylinder 70 with one end of each spring engaging the opposite side of the piston, the other end of each of the springs having engagement with flanges 73 attached to the cylinder. The piston 71 has a pulley 74 attached to it.

The brake shoes 75 are hung in the frame 65 in a usual way and each arranged to be pressed against a wheel by means of arms 76, keyed to the shafts 77, mounted in suitable bearings in the main frame 65. Keyed to the outer ends of each shaft 77 is an arm 78 carrying at its upper end the pulley 79. Close to each one of the two arms 78 nearest the cylinder 70 a pulley 80 is attached to the main frame 65. Fastened to the upper flange 73 of the cylinder 70 is a rope 81, as shown to the right in Fig. 8. This rope passes around the pulley 74 on piston 71, then out around the pulley 79 of the nearest arm 78, then back around pulley 80, then around pulley 79 of the next arm 78 then back around the pulley 80', then out around the pulley 79 of the farthest arm 78 and back to the fastening 82 on the main frame 65. This last is shown to the left in Fig. 8. When the compressed air is in the cylinder 70 the brakes are released. When the air is let out of the cylinder the brakes are set by the springs 72 pressing the piston 71 back in the cylinder and pulling on the rope 81. A chain may be used in place of the rope 81 if desired.

Referring to the mechanism for harnessing a number of trucks together to form a locomotive like that shown in Figs. 6 and 7, it will be noted that there are eight truck frames 65 which are coupled together in four pairs, each pair by a frame 83 which consists of a ribbed plate 84 from which two pairs of the arms 85 extend in opposite directions and are connected across at their outer ends by the hollow round portions 86. The ribs 87 of the ribbed plate 84 are curved at the center of the plate to form a vertical bearing. As the ribbed plate 68 Fig. 10, is exactly like ribbed plate 84, for the portion shown, that view will serve to illustrate it, the understanding being that rib 87 is the same as rib 69. Each one of the two round portions 86 of the frames 83, are pivoted for their full length between the arms 85 in a frame 88 which has journal studs 89 extending from it at the center to fit in bearings in the trough like frame 90 which has projections at the center in which the bearings are formed and which are curved on the outside to fit inside the curved ribs 69 on the frame 68 to form a vertical bearing. It will be seen that by the mechanism just described the truck frames 65 are coupled together in pairs at a point located centrally between them by two universal joints which permit independent movement of each truck in all directions except as to the distance between the centers. Connection between the frame 83 of one pair of trucks 65 and the frame 83 of another pair of trucks is made by the frame 91, which consists of the truck bolster 92, to which at each end, the two bars 93 are attached. These bars are connected together at each end by the round hollow members 94 each of which has a bearing for nearly its entire length between the bars 93 in a frame 95 which has journal studs 96 at its center corresponding in shape to the journal studs 89 Fig. 10. This frame 95 is carried in a trough like frame 97 which at its center is like the frame 90 for the portion shown in Fig. 10, the projections on the frame 97 forming a vertical bearing inside the curved portion of the ribs 87. The body bolster 98 of the locomotive body 99 is connected in a usual way with the truck bolster 92. It will be noted that the frame mechanism for harnessing the truck frames 65 into pairs and the frame mechanism for harnessing the pairs of trucks together both lie in approximately the same horizontal plane so the weight of the locomotive can be low on the track, a very important consideration in locomotives for high speed on sharp curves.

It is intended, owing to the novel insulating features of the motors, that this locomotive will employ direct electric current of higher initial voltage than is now the practice. The present initial voltage of direct current adopted by the General Electric Company and the Westinghouse Electric and Manufacturing Company is three thousand volts. I intend to employ six thousand volts pressure in the twenty-four motors of the locomotive shown in Figs. 6 and 7. The dotted lines indicating electrical connections of the motors illustrate the arrangement. The motors are divided into three groups of eight motors each. The motors of each group are connected permanently in series with switch connections between the groups so the three groups may be operated in series or in parallel. The grouping of eight motors in series reduces the voltage in the windings of any one motor to seven hundred and fifty volts, but the six thousand volt pressure remains across the line.

Having described my invention, I claim,

1. In an electric locomotive, an axle, two driving wheels mounted on the axle, two axle boxes with bearings mounted on the axle one at each end outside of the driving wheels, members extending from the axle boxes to proximity of the periphery of the driving wheels, means for connecting the ends of the members of the axle boxes together, and an electric motor mounted around the axle between the driving wheels having its revolving driving part mounted on the axle and its stationary part supported by the members extending from the axle boxes.

2. In an electric locomotive, an axle, two axle boxes, one mounted at each end of said axle and each having an arm extending from it, a bar connecting the ends of said arms, driving wheels mounted on said axle between the said axle boxes and an electric motor mounted around said axle between said driving wheels having its revolving driving part secured to said axle and its stationary part secured to said bar.

3. In an electric locomotive, an axle, two axle boxes, one mounted at each end of said axle and each having arms extending from it, bars connecting the ends of the arms of one axle box to the ends of the arms of the other axle box, driving wheels mounted on said axle between the said axle boxes and an electric motor mounted around said axle between said driving wheels having its revolving driving part secured to said axle and its stationary part secured to said bars.

4. In an electric locomotive, an axle, two axle boxes, one mounted at each end of said axle and each having an arm extending from it, a bar connecting the ends of said arms, driving wheels mounted on said axle between the said axle boxes and an electric motor mounted around said axle between said driving wheels having its revolving driving part secured to said axle but electrically insulated therefrom, and its stationary part secured to said bar, but electrically insulated therefrom.

5. In an electric locomotive, an axle, two axle boxes, one mounted at each end of said axle and each having an arm extending from it, an angle bar connecting the ends of said arms, driving wheels mounted on said axle between the said axle boxes and an electric motor mounted around said axle between said driving wheels having its revolving driving part secured to said axle and its stationary part secured to said angle bar.

6. In an electric locomotive, an axle, two axle boxes, one mounted at each end of said axle and each having arms extending from it in directions away from and above the axle; bars connecting the ends of the arms of one axle box to the ends of the arms of the other axle box, driving wheels mounted on said axle between the said axle boxes and an electric motor mounted around said axle between said driving wheels having its revolving driving part secured to said axle and its stationary part secured to said bars.

7. In an electric locomotive, an axle, a journal at each end of the axle, driving wheels rigidly secured to the axle between the journals, axle boxes for the journals, a motor, comprising a frame and a revolving driving part, mounted between the driving wheels with its axis held in fixed parallel relation with the axle by attachments between the motor frame and the axle boxes extending across the faces of the treads of the driving wheels, and means connecting the revolving driving part of the motor to the axle to drive it.

8. In an electric locomotive, the combination of a truck frame having vertical slots at each side, a plurality of axles for the truck frame, each of said axles having a journal at each end and driving wheels rigidly secured to it between the journals, axle boxes for the journals arranged in the vertical slots of the truck frame for vertical movement therein, resilient means between the axle boxes and the truck frame, a motor, comprising a frame and a revolving driving part, mounted between the driving wheels with its axis held in fixed parallel relation with the axle by attachments between the motor frame and the axle boxes extending across the faces of the treads of the driving wheels, and means connecting the revolving driving part of the motor to the axle to drive it.

9. In an electric locomotive, an axle, two axle boxes one mounted at each end of the axle, driving wheels rigidly secured to the axle between the axle boxes, a bar rigidly connecting the two axle boxes and a motor mounted between the driving wheels with its stationary part connected to the bar so as to maintain the axis of the motor in parallelism with the axle and its revolving driving part connected to the axle to drive it.

10. In an electric locomotive, an axle, two axle boxes one mounted at each end of the axle, driving wheels rigidly secured to the axle between the axle boxes, two bars each having one of its ends rigidly connected to one axle box and its other end rigidly connected to the other axle box and a motor mounted between the driving wheels with its stationary part connected to the bars so as to maintain the axis of the motor in parallelism with the axle and its revolving driving part connected to the axle to drive it.

11. In an electric locomotive, a motor comprising a stationary frame having a circular aperture and a cylindrical driving part arranged to revolve in the aperture with adjusting means located above the center of the cylindrical driving part and between the driving part and the aperture to maintain concentric relation between the cylindrical driving part and the circular aperture.

12. In an electric locomotive, a motor comprising a frame having a circular aperture and a cylindrical driving part arranged to revolve in the said aperture in a position normally concentric with the aperture in combination with indicator and gauging means to determine the positions of the frame and cylindrical driving part with relation to one another.

13. In an electric locomotive, the combination of a motor comprising a frame having a circular aperture and a cylindrical revolving part arranged normally in concentric relation to the circular aperture, means of adjustment to maintain said concentric relation and indicator gauging means to determine the relative positions of the frame and revolving part.

14. In an electric locomotive, an axle, two driving wheels mounted on the axle, two axle boxes with bearings mounted on the axle one at each end outside of the driving wheels, members extending from the axle boxes to proximity of the periphery of the driving wheels, detachable means for connecting the ends of the members of the axle boxes together, and an electric motor mounted around the axle between the driving wheels having its revolving driving part mounted on the axle and its stationary part supported by the members extending from the axle boxes.

15. In an electric locomotive, a motor comprising a rotary armature, an axle located concentrically within said armature, and a plurality of pole faces adjustably supported from overhead connections so as to cooperate with said armature in producing a rotary motion of said axle.

16. In an electric locomotive, a driving unit comprising a plurality of driving wheels, axle boxes having bearings therein, axles journaled in said bearings, a rotary armature secured to each axle, and stationary field pole pieces adjustably supported from overhead connection with said axle boxes to cooperate with said armature in producing a rotary motion of said driving wheels.

17. In an electric locomotive, a plurality of trucks each comprising an axle having a rotary armature concentrically mounted thereon, a plurality of stationary field pieces adjustably mounted from over-head attachment for vertical movement, driving wheels mounted on said axle, and individual wheel brakes to prevent rotation of said driving wheels when desired.

18. In an electric locomotive, a plurality of trucks comprising an axle, driving wheels mounted on said axle, axle boxes journaled on said axle, arms extending from each of said axle boxes substantially from the periphery of said wheels, supporting members extending substantially parallel to said axle and connecting corresponding ends of the arms, means for adjustably suspending a motor from said supporting member, resilient supporting means mounted on said axle boxes, and a frame suspended from said resilient supporting means having sliding engagement with said axle boxes.

19. In an electrically driven truck, the combination with a plurality of wheels, of an axle, and an electric driving motor mounted on said axle with the latter constituting the core of the rotating part of the motor, the stator of said motor being adjustably mounted by over-head connections on said axle and supported independently thereby.

20. In an electric locomotive, the combination with a motor comprising a stationary frame having a cylindrical space therein, of a cylindrical driving element, means for supporting said driving element to rotate in said cylindrical space, and overhead mechanism for adjusting said supporting means to maintain a concentric relation between said cylindrical driving element and said cylindrical space.

21. In an electric locomotive, the combination with a plurality of wheels, of an axle connecting the same, a motor comprising a stationary frame having a cylindrical space concentric with said axle, a driving element mounted on said axle for rotation in said cylindrical space, and overhead means for adjusting the position of the stationary motor frame to maintain a concentric relation between said driving element and said cylindrical space during the rotation of said axle and of said wheels.

22. In an electric locomotive, the combination with an axle, of a pair of spaced-apart wheels thereon, a truck frame, means for resiliently supporting said truck frame on said axle, a driving motor, means for supporting said motor on said axle, driving connections between said motor and said axle, and guides on said truck frame to prevent tilting of said supporting means while the motor is supported on said axle independently of said truck frame.

23. In an electric locomotive, the combination with an axle, of a pair of spaced-apart wheels thereon adapted to travel on a track, a driving motor between said wheels, driving connections between said motor and said axle, bearings for the axle, means for supporting the motor on said bearings in fixed relation to said axle, a truck frame, means for supporting the truck frame on said axle, and means for confining the said supporting means to upright movements relatively to said truck frame while said motor is supported on said axle independently of said truck.

EDMUND C. MORGAN.